United States Patent
Konno et al.

[11] Patent Number: 5,454,501
[45] Date of Patent: Oct. 3, 1995

[54] TAPE GUIDE ROLLER FOR TAPE CASSETTE

[75] Inventors: Toshikazu Konno; Takashi Oogi, both of Miyagi; Susumu Morita, Hyogo, all of Japan

[73] Assignees: Sony Corporation, Tokyo; APLS Co., Ltd., Okayama, both of Japan

[21] Appl. No.: 30,382

[22] PCT Filed: Jul. 31, 1992

[86] PCT No.: PCT/JP92/00978

§ 371 Date: May 28, 1993

§ 102(e) Date: May 28, 1993

[87] PCT Pub. No.: WO93/03484

PCT Pub. Date: Feb. 18, 1993

[30] Foreign Application Priority Data

Jul. 31, 1991 [JP] Japan .................. 3-213114

[51] Int. Cl.$^6$ .................. G11B 23/087; B29C 45/16
[52] U.S. Cl. .................. 226/190
[58] Field of Search .................. 226/190, 194

[56] References Cited

U.S. PATENT DOCUMENTS

| | | | |
|---|---|---|---|
| 3,734,373 | 5/1973 | Dattilo | 226/190 X |
| 4,033,495 | 7/1977 | Plat | 226/190 |
| 4,607,808 | 8/1986 | Collins | 226/190 X |
| 4,729,500 | 3/1988 | Gwon | 226/190 |
| 4,754,908 | 7/1988 | Tanaka et al. | 226/190 |
| 4,903,878 | 2/1990 | Usami et al. | 226/190 |

FOREIGN PATENT DOCUMENTS

| | | |
|---|---|---|
| 58-222474 | 12/1983 | Japan . |
| 2260291 | 10/1990 | Japan . |
| 324926 | 2/1991 | Japan . |

*Primary Examiner*—Andrew M. Falik
*Attorney, Agent, or Firm*—Ronald P. Kananen

[57] ABSTRACT

A tape guide roller for a tape cassette comprises an inner cylindrical body including a flange portion projecting from the outer circumference on one end thereof, and a synthetic resin injection portion provided at the outer circumferential surface at the other end thereof, the inner cylindrical body being molded by injecting synthetic resin from a direction substantially perpendicular to the axial direction thereof and an outer cylindrical body having an inside diameter such that it fits tightly over the inner cylindrical body, and includes a synthetic resin injection portion provided at the outer circumferential surface on the end side thereof opposite to the end side which serves as the insertion end for the inner side cylindrical body. The outer cylindrical body is molded by injecting synthetic resin from a direction substantially perpendicular to its axial direction through the synthetic resin injection portion. The outer cylindrical body is inserted from its insertion end onto the inner cylindrical body so that the former becomes integral with the latter, thus comprising a tape guide roller.

2 Claims, 6 Drawing Sheets

FIG. 1

PRIOR ART

TAPE GUIDE ROLLER FOR TAPE CASSETTE

BACKGROUND OF THE INVENTION

1. Field of the Invention

This invention relates to a tape guide roller for a tape cassette, which is disposed within a tape cassette and is used to guide the running of a magnetic tape accommodated within the tape cassette.

2. Background

Figure 1:
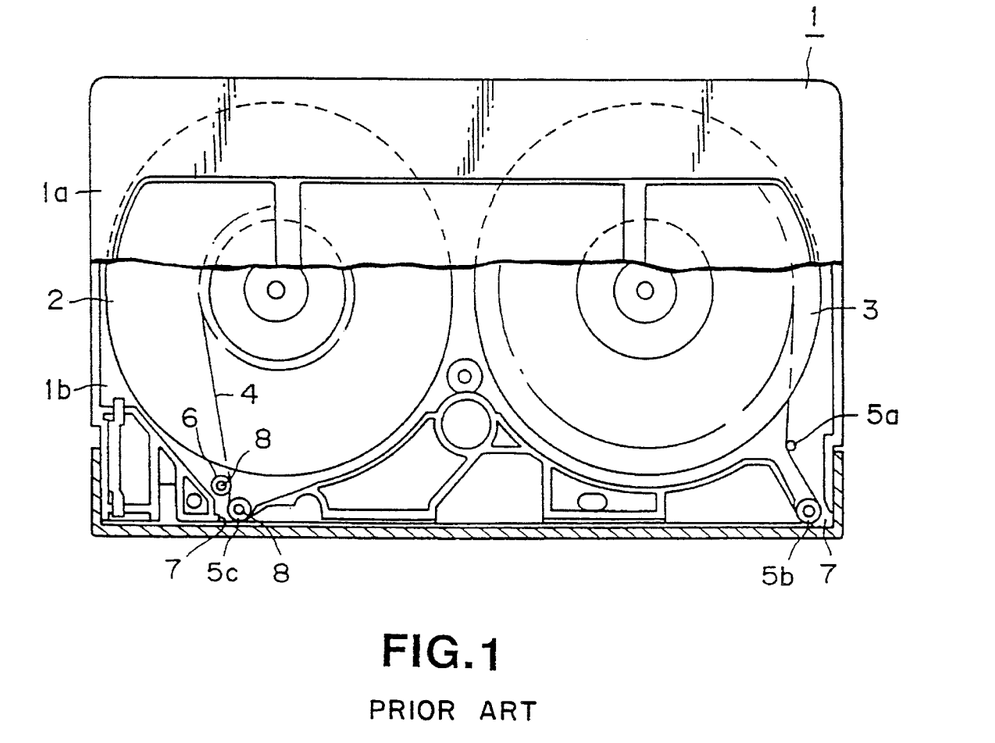
FIG. 1 is a partly broken plan view showing a conventional tape cassette.

Generally, tape cassettes of the structure shown in FIG. 1 include a pair of tape reels 2 and 3 which are rotatably accommodated within a cassette 1, comprised of an upper half 1a and a lower half 1b combined by butt joining and having a magnetic tape 4 wound between the tape reels 2 and 3.

Within the cassette 1, in order to guide the direction of movement of the magnetic tape 4 as it travels between the pair of tape reels 2, 3, tape guides 5a, 5b and 5c and a plurality of tape guide rollers 6 (only one is shown in the figure) are disposed. One tape guide 5a is disposed in such a manner that it projects upwardly from the lower half 1b at a position in the vicinity of the tape reel 3. The tape guides 5b and 5c are located at positions in the vicinity of window portions 7, 7 for directing the magnetic tape 4 as it extends across the front side of the cassette 1. In addition, the tape guide roller 6 is disposed between the tape guide 5c and the tape reel 2. During operation, the tape guide roller 6 functions to direct the magnetic tape 4 into a position so that when the tape cassette is loaded into, e.g., a video tape recorder, the tape guide roller 6 rotates, following the running of the magnetic tape 4 and smoothly guides the running direction of the magnetic tape 4.

It is noted that while the tape guide roller 6 is disposed between the tape reel 2 and the tape guide 5c in the example shown in FIG. 1, similar tape guide roller 6 may be disposed between the tape reel 3 and the tape guide 5b and between the tape reel 2 and the tape guide 5c. In such a case, the tape guide 5a disposed on the tape reel 3 side becomes unnecessary.

Figure 2:
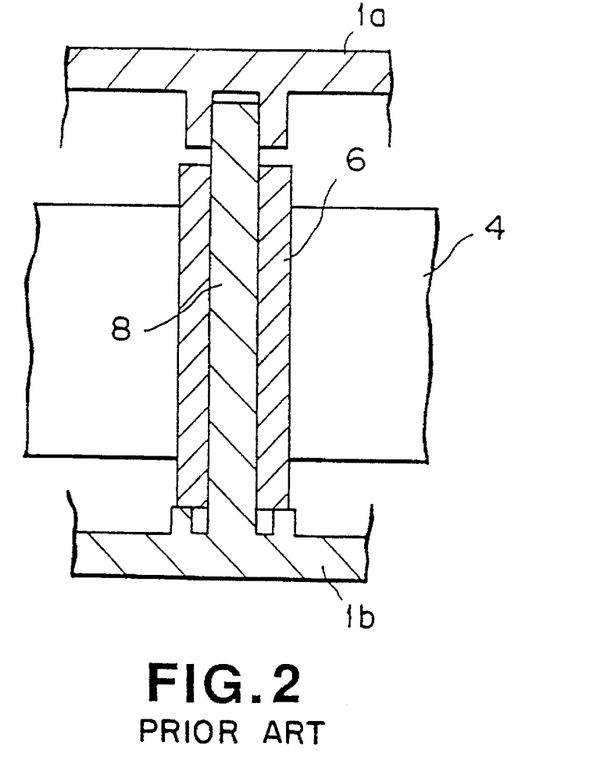
FIG. 2 is a cross sectional view showing the attachment state of a tape guide roller disposed within the above-mentioned tape cassette.

For conventional tape cassettes, tape guide rollers formed by cutting or machining a synthetic resin body so that they take a cylindrical form, are widely used. Such tape guide rollers are used to guarantee sufficient circularity, to guarantee that the tape guide roller 6 can smoothly rotate without producing rotation noise, etc. when attached on a support shaft 8 projecting upwardly within the cassette half 1b as shown in FIG. 2, and to guarantee precise guidance of the magnetic tape 4.

However, although it is possible using tape guide rollers formed by cutting a synthetic resin body as described above to guarantee sufficient machining accuracy, there is the problem in that the machining efficiency is extremely poor, so the productivity is extremely poor.

In view of this, and in order to eliminate problems with tape guide rollers formed by machining, such as cutting, and to attain improvements in the machining efficiency and productivity, tape guide rollers formed by a molded body of synthetic resin (plastic) are used.

Meanwhile, it is necessary that the tape guide rollers disposed within the tape cassette have sufficient strength so that they can tolerate repetitive use. In addition, it is necessary that the tape guide rollers rotate in a stable manner without producing deformation, etc. when it runs with a magnetic tape being wound thereon, i.e., while it serves to guide the running of the magnetic tape.

Figure 3:
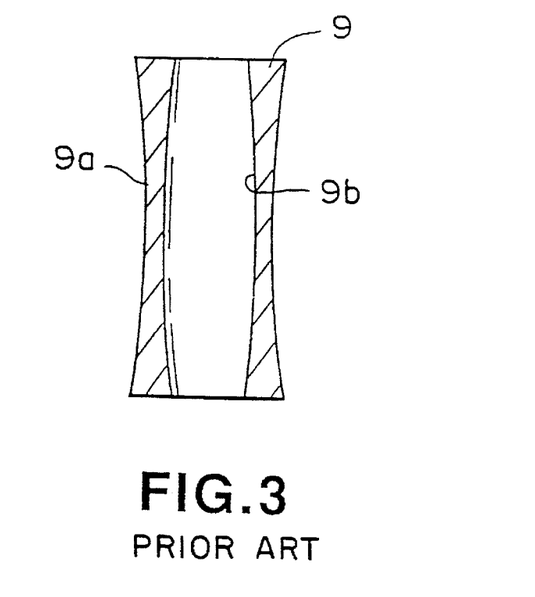
FIG. 3 is a cross sectional view of a conventional tape guide roller formed by synthetic resin.

In order to satisfy these requirements, a tape guide roller 9 (FIG. 3) comprised of synthetic resin formed as a single cylindrical body having sufficient thickness has been used. In such a tape guide roller 9, however, when molten synthetic resin material is molded by a metal mold unit and the molded material is then cooled, there occurs a so-called sink or withdrawal wherein portions of the roller circumference, in the vicinity of the central portions of the outer circumferential surface 9a and the inner circumferential surface 9b, are caused to be thinner in thickness as shown in FIG. 3, thus failing to maintain straightness and circularity, etc. As a result, when such a tape guide roller 9 is attached on a support shaft 8 within the cassette, it does not rotate coaxially with the support shaft 8 without any eccentric rotation. Thus, rubbing between the tape guide roller 9 and the internal surface of the cassette 1, or the like takes place, giving rise to rotation noise. In addition, since the outer circumferential surface 9a, which serves as the guide surface for the magnetic tape 4, is curved it becomes impossible to guide the magnetic tape 4 in a stable manner and in a direction corresponding to the running direction.

In order to solve the problems with such tape guide rollers, i.e., those formed as a single cylindrical body having sufficient thickness, a tape guide roller as described in the Japanese Patent Application Laid Open No. 24926/1991 publication has been proposed.

The tape guide roller described in this publication has a double layer structure comprised of a cylindrical body on the inner circumferential side and a cylindrical body on the outer circumferential side, and is formed by molding these cylindrical bodies by using a double molding machine. More particularly, the cylindrical body on the inner circumferential side of the tape guide roller is molded using a double molding machine. It comprises a cylindrical body having the same diameter from one end side to the other side, or a cylindrical body formed so that a projection of a small diameter is projected on one end surface at one end side thereof. Since the cylindrical body on the inner circumferential side is molded with the end surface on one end side thereof being caused to be a gate portion serving as an injection portion for synthetic resin (plastic) material, the diameter of the portion on the other side opposite to the gate portion is contracted. Particularly, where the cylindrical body on the outer circumferential side is molded on a double molding machine, the inner circumferential side undergoes contraction relative to the outer circumferential side, so the end side opposite to the gate portion is contracted to a considerable extent.

As a result, it become impossible to guarantee sufficient circularity of a tape guide roller formed by molding.

In addition, a tape guide roller disposed within a tape cassette used in a video tape recorder for business use may rotate at an extremely high speed of 15,000 rpm at the time of running of a magnetic tape, while a tape guide roller disposed within a tape cassette for consumer use may rotate at a rotational speed of 3,000 to 4,000 rpm. For the above reasons, in tape guide rollers designed to rotate at an extremely high speed, straightness and circularity of extremely high accuracy is required.

SUMMARY OF THE INVENTION

With the above in view, an object of this invention is to provide a tape guide roller which can maintain straightness and circularity of extremely high accuracy, and which is useful when used in tape cassette for business use which may rotate at an extremely high speed.

Moreover, this invention has been proposed with a view to providing a tape guide roller for a tape cassette which can maintain straightness and circularity with high accuracy, and which can guide the running of a magnetic tape in a stable manner without producing rotation noise when guiding the running of the magnetic tape.

Further, an object of this invention is to provide a tape guide roller which can guarantee sufficient mechanical strength, and which can stably guide the running of a magnetic tape for a long time.

In addition, an object of this invention is to provide a tape cassette with a tape guide roller having straightness and circularity of extremely high accuracy which can be easily manufactured.

A tape guide roller for a tape cassette according to this invention comprises: an inner cylindrical body including a flange portion projected at the outer circumference on one end side thereof, and a synthetic resin injection portion provided at the outer circumferential surface on the other side thereof, the inner cylindrical body being molded by injecting synthetic resin from a direction substantially perpendicular to the axial direction thereof through the synthetic resin injection portion; and an outer cylindrical body having an inside diameter such that it is tightly fitted over the inner cylindrical body, and including a synthetic resin injection portion provided at the outer circumferential surface on the other end side thereof opposite to the end side serving as the insertion end side for the inner cylindrical body, the outer cylindrical body being molded by injecting synthetic resin from a direction substantially perpendicular to the axial direction thereof through the synthetic resin injection portion, whereby the outer cylindrical body is inserted from the insertion end on one end side thereof onto the other end side of the inner cylindrical body so that the outer cylindrical body is caused to be integral with the inner cylindrical body.

Moreover, a tape guide roller for a tape cassette according to this invention is such that the thickness of the outer cylindrical body, as formed, is caused to be thicker than the thickness of the inner cylindrical body.

Further, a tape guide roller for a tape cassette according to this invention is such that the outer circumferential surface of the outer cylindrical body fitted over the inner cylindrical body is subjected to centerless grinding.

The inner cylindrical body of the tape guide roller is caused to be thicker as a result of the fact that the flange portion projects from the outer circumference at the end side opposite to the side where synthetic resin is injected. As a result, contraction after molding is prevented. Thus, circularity and straightness of high accuracy are guaranteed. In addition, the portion on the end side of the inner circumferential side, at which the flange projects, has large mechanical strength. Accordingly, the circularity and straightness of the outer cylindrical body fitted over the outer circumferential side of the inner cylindrical body are guaranteed. Thus, a tape guide roller which has ensured circularity and straightness of extremely high accuracy can be obtained.

Moreover, by allowing the outer circumferential surface of the outer cylindrical body, which has circularity and straightness of an extremely high accuracy to be subjected to centerless grinding, a tape guide roller which has guaranteed circularity and straightness of even higher accuracy can be obtained.

Further, by allowing the thickness of the outer cylindrical body to be thicker than the thickness of the inner cylindrical body, the outer circumferential surface of the outer cylindrical body can be subjected to centerless grinding. Thus, a tape guide roller which has guaranteed circularity and straightness of a higher accuracy can be obtained.

In addition, by molding the outer cylindrical body on the outer circumferential side of the inner cylindrical body mold, circularity and straightness of high accuracy are guaranteed, and a tape guide roller having circularity and straightness of an extremely high accuracy can be obtained.

DETAILED DESCRIPTION OF THE PRESENTLY PREFERRED EMBODIMENTS

An embodiment of a tape guide roller and a method of manufacturing a tape guide roller according to this invention will now be described with reference to the attached drawings.

Figure 4:
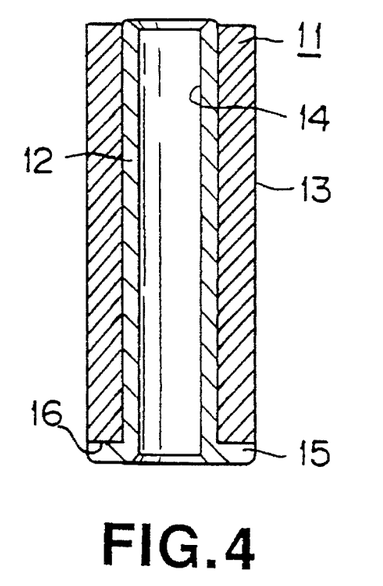
FIG. 4 is a cross sectional view of a tape guide roller according to this invention.

A tape guide roller 11 according to this invention comprises, as shown in FIG. 4, an inner cylindrical body 12 formed by molding synthetic resin, and an outer cylindrical body 13 formed by molding synthetic resin. The outer cylindrical body 12 is fitted over the outer circumferential side of the inner cylindrical body 12.

Figure 5:
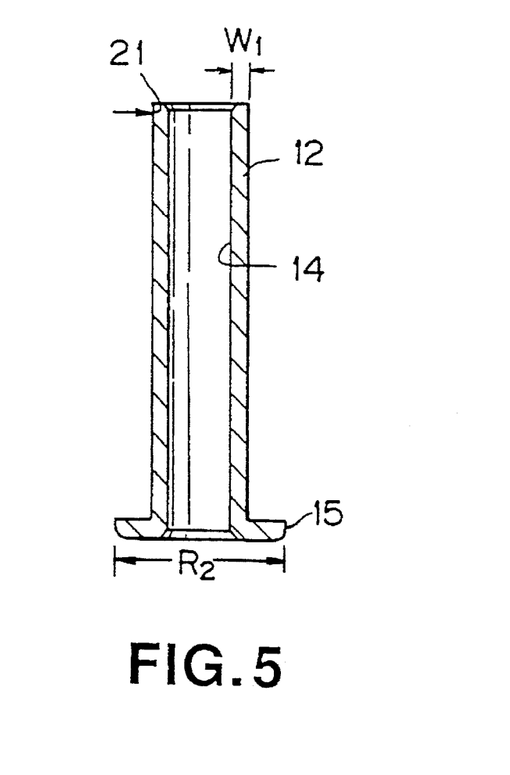
FIG. 5 is a cross sectional view showing an inner cylindrical body of a tape guide roller according to this invention.

More particularly, as shown in FIG. 5, the inner cylindrical body 12 has, at its center portion, a center hole 14 adapted so that a support shaft (not shown) projecting from within a cassette half (not shown) may be inserted therethrough, and a support flange portion 15 projecting at one end side thereof. The support flange portion 15 is adapted to be mounted on a roller support table formed on the bottom portion side of the support shaft when the inner cylindrical body 12 is supported by inserting the support shaft through the center hole 14. This support flange portion 15 is formed so that it has an outer circumferential diameter $R_2$ substantially equal to or smaller than an outer circumferential diameter $R_1$ of the outer cylindrical body 13 when fitted over the inner cylindrical body 12.

Further, as shown in FIG. 5, the inner circumferential body 12 comprises a synthetic resin injection portion 21 provided at the outer circumferential surface on the end opposite to the end from which the support flange portion 15 projects. Thus, the inner cylindrical body 12 is molded by injecting synthetic resin from a direction substantially perpendicular to its axial direction through the synthetic resin injection portion 21. Namely, the inner cylindrical body 12 is molded by allowing a gate portion of a metal mold to face toward the synthetic resin injection portion 21 to inject synthetic resin through the synthetic resin injection portion 21 from the gate portion.

As the synthetic resin injection portion 21, one portion or two portions opposite to each other may be provided at the outer circumferential surface on the end side of the inner cylindrical body 12.

Since the inner cylindrical body 12 is molded so that the synthetic resin injection portion 21 is provided at such a position, the synthetic resin injected from the synthetic resin injection portion 21 flows from the end opposite the flange portion 15 toward the support flange portion 15, so that the synthetic resin injected from the synthetic resin injection portion 21 is not injected at the middle portions of the inner circumferential surface or the outer circumferential surface, i.e., on the center hole 14 side. For this reason, in the inner cylindrical body 12, molding distortions such as sink or withdrawal, etc. in the middle portions of the inner circumferential surface and the outer circumferential surface on the center penetration hole 14 side are suppressed. Thus, the inner cylindrical body 12 is molded with a high degree of circularity and straightness.

Meanwhile, when using synthetic resin to mold a tubular cylindrical body such that the thickness is uniform over the total length thereof, if such a cylindrical body is molded by injecting synthetic resin from one end side, sink or withdrawal in a direction of contracting the diameter is apt to occur on the end portion side opposite to the side where synthetic resin is injected. This is because it is difficult to maintain a uniform pressure of the synthetic resin from the synthetic resin injection portion to a position spaced from the synthetic resin injection portion, so the resin pressure at the position spaced from the synthetic resin injection portion is lower.

However, the inner cylindrical body 12 of the tape guide roller 11 according to this invention is provided, on the end portion side opposite to the side where the synthetic resin injection portion 21 is located, with the support flange portion 15 which serves to allow the thickness of the end where the flange 15 is positioned to be thick. When the support flange portion 15 is provided in this way, sink or withdrawal toward the outer peripheral edge side takes place at the support flange portion 15 at the time of molding. As a result, a balance between forces tending to produce a sink or withdrawal in the direction of contracting the diameter of the center hole 14 and forces tending to produce a sink or withdrawal toward the outer peripheral edge side of the support flange portion 15 is established. Thus, it is possible to improve molding accuracy on the side of the inner cylindrical body 12 where the support flange portion 15 is positioned.

Figure 6:
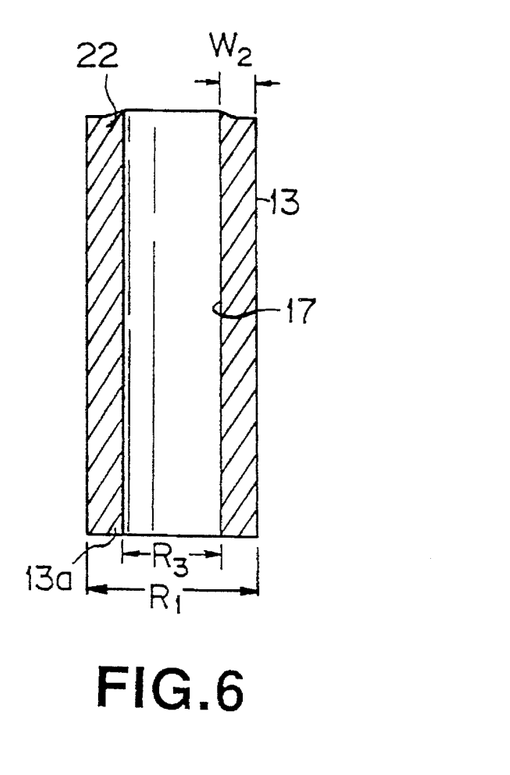
FIG. 6 is a cross sectional view showing an outer cylindrical body of a tape guide roller according to this invention.

Moreover, as shown in FIG. 6, the outer cylindrical body 13 is formed as a uniform cylindrical body provided with a center hole 17 having an inside diameter $R_3$ such that the outer cylindrical body 13 is adapted to tightly fit over the inner cylindrical body 12. This outer cylindrical body 13 comprises a synthetic resin injection portion 22 provided at the outer circumferential surface on the side opposite to the end which serves as the insertion (fitting) end 13a side for the inner cylindrical body 12. The outer cylindrical body 13 is molded by injecting synthetic resin from a direction substantially perpendicular to the axial direction through the synthetic resin injection portion 22. The outer cylindrical body 13 molded in this way is formed so that it maintains circularity and straightness of high accuracy without producing distortion such as sink or withdrawal in the middle portions of the outer circumferential surface or the inner circumferential surface of the center hole 17, similarly to the previously described inner cylindrical body 12.

The outer cylindrical body 13 is formed with a thickness $W_2$ thicker than the thickness $W_1$ of the inner cylindrical body 12. The thickness $W_2$ of the outer cylindrical body 13 is made thicker than the thickness $W_1$ of the inner cylindrical body 12 to allow for the outer circumferential surface of the outer cylindrical body 13 to be ground as described later.

The outer cylindrical body 13 formed as described above is fitted over the outer circumferential surface side of the inner cylindrical body 12 with the end side opposite to the side where the synthetic resin injection portion 22 is provided serving as an insertion (fitting) end 13a so that the outer cylindrical body 13 is integral with the inner cylindrical body 12. At this time, the outer cylindrical body 13 is placed so that the end surface of the insertion (fitting) end 13a is caused to be in tight contact with the support flange portion 15 of the inner cylindrical body 12. By fitting the outer cylindrical body 13 over the inner cylindrical body 12 in this way, a tape guide roller 11 comprising the inner cylindrical body 12 and the outer cylindrical body 13 integrally formed as a two-layer structure is made.

Meanwhile, in the outer cylindrical body 13, there is the possibility of a molding distortion, such as a sink or withdrawal in the direction of contracting the diameter at the end side serving as the insertion (fitting) end 13a, i.e., the end opposite to where the synthetic resin insertion portion 22 is provided. The insertion (fitting) end 13a of the outer cylindrical body 13, i.e., where a sink or withdrawal in the direction of contracting the diameter may take place, is fitted over one end side of the inner cylindrical body 12, which has a large mechanical strength as the result of the increased thickness support flange portion 15. For this reason, even if the outer cylindrical body 13 has a sink or withdrawal in a direction of contracting the diameter on the insertion (fitting) end 13a, it may not exert much influence on the circularity of the end of the inner cylindrical body 12 which has circularity of high accuracy. In other words, the circularity of the center hole 14 of the inner cylindrical body 12 is not compromised.

Figure 7:
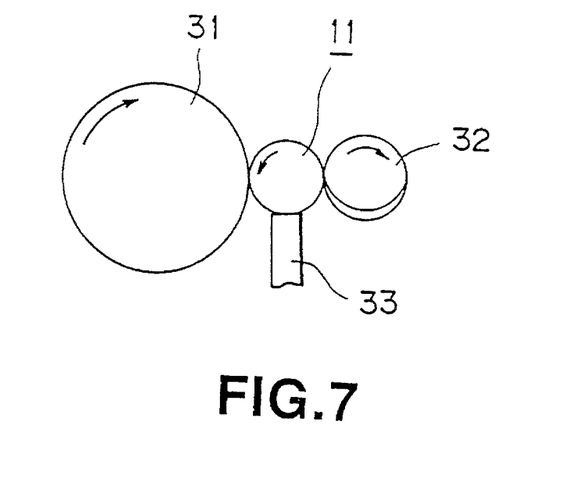
FIG. 7 is a schematic front view showing the state where the tape guide roller according to this invention is ground by using a centerless grinder.

The outer circumferential surface of the outer cylindrical body 13 may be ground by a centerless grinding method. This centerless grinding method is carried out, as shown in FIG. 7, by using a centerless grinder provided with a grinding abrasive wheel 31, a feed adjustment roller 32 opposite to the grinding abrasive wheel 31, and a ground material support plate 33 for supporting tape guide roller 11 as a material to be ground inserted between the grinding abrasive wheel 31 and the feed adjustment roller 32. In order to grind the outer circumferential surface of the outer cylindrical body 13, the tape guide roller 11 is inserted into position between the grinding abrasive wheel 31 and the feed adjustment roller 32 and is rotationally driven in a fixed direction so that the tape guide roller 11 is supported by the ground material support plate 33. The tape guide roller 11 inserted into position between the grinding abrasive wheel 31 and the feed adjustment roller 32 is subjected to a feed operation in the axial direction while being rotated by the grinding abrasive wheel 31 and the feed adjustment roller 32. During the feed operation of the tape guide roller 11, grinding of the outer circumferential surface of the outer cylindrical body 13 is carried out by the grinding abrasive wheel 31.

By implementing centerless grinding of the outer circumferential surface of the outer cylindrical body 13, the tape guide roller 11 is caused to have circularity and straightness of extremely high accuracy. Even where a particular outer cylindrical body 13 has a sink or withdrawal in a direction of contracting the diameter on the end side serving as insertion (fitting) end 13a, it is possible to form a tape guide roller 11 having circularity and straightness of extremely high accuracy in which the above-mentioned sink or withdrawal is corrected.

It is to be noted that in the case where centerless grinding is implemented on the outer circumferential surface of outer cylindrical body 13 as described above, the thickness $W_2$ of the outer cylindrical body 13 is allowed to be thicker than the thickness $W_1$ of the inner cylindrical body 12, whereby thinning of the thickness of the outer cylindrical body 13 by grinding is prevented. Thus, satisfactory grinding can be implemented.

The inner cylindrical body 12 and the outer cylindrical body 13 which comprise the tape guide roller 11 may be formed of the same polyacetal resin (plastic) or they may be formed using different synthetic resin materials for each.

Namely, it is desirable that since the inner cylindrical body 12 functions as a support portion for the support shaft within the cassette, it should be formed using a synthetic resin material which has excellent abrasion resistance and smoothness; and that since the outer cylindrical body 13 serves to guide the running of a magnetic tape, it is should be formed using a synthetic resin material of low sori grade which can easily and accurately shaped at the time of molding.

While, in the above-described embodiment, a method of independently molding the inner cylindrical body 12 and outer cylindrical body 13 to fit over the inner cylindrical body 12 so that they may be integrally formed to thereby form tape guide roller 11 is described, there may also be employed a method of manufacturing the inner cylindrical body 12 and outer cylindrical body 13 by a series of molding processes by using a double molding machine.

Figure 8:
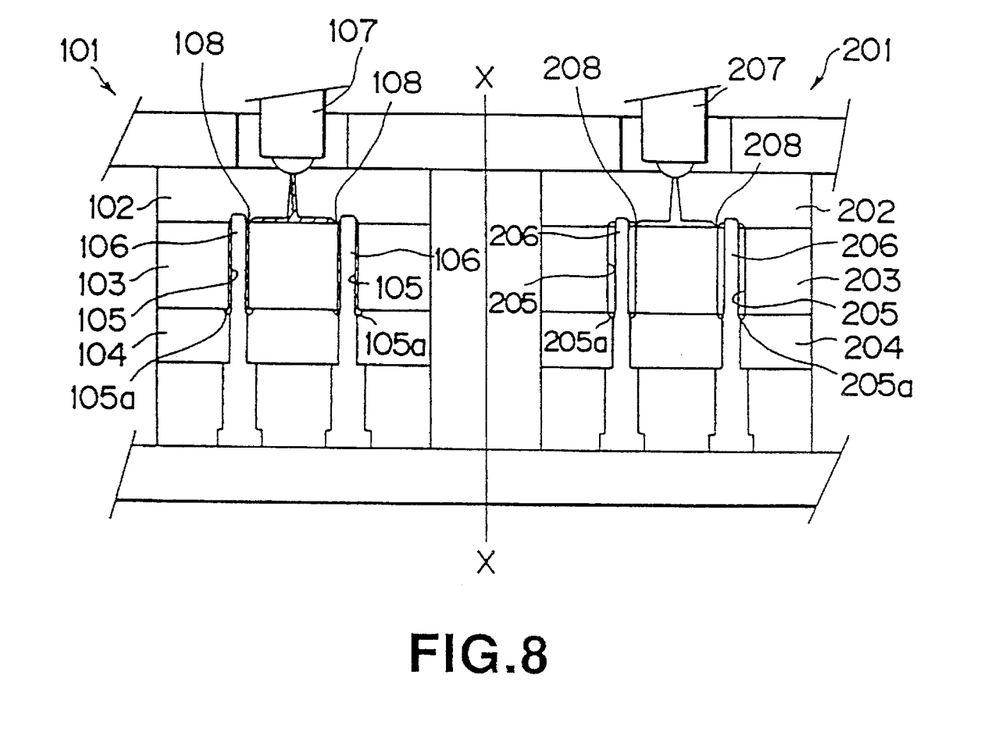
FIG. 8 is a schematic cross sectional view showing a metal mold portion of a double molding machine for molding a tape guide roller according to this invention.

A double molding machine for molding the tape guide roller 11 according to this invention is generally constructed as shown in FIG. 8. This double molding machine comprises a primary side molding unit 101 disposed on the left side of the line indicated by X—X in FIG. 8, and a secondary side molding unit 201 is disposed on the right side thereof. These primary and secondary side molding units 101 and 201 comprise stationary side metal mold sections 102, 202; and intermediate plate sections 103, 203 and movable side metal mold sections 104, 204 which constitute the essential parts of the metal molds for molding the inner cylindrical body 12 and the outer cylindrical body 13, and are adapted so that they come into contact with the stationary side metal mold sections 102, 202 and move away therefrom, respectively. These movable side metal mold sections 104, 204 are moveable in a direction to move into and out of contact the stationary side metal mold sections 101, 202 and the intermediate plate sections 103, 203 and can rotate by an angle of 180 degrees, with the line X—X in FIG. 8 being as the center of rotation, and can transfer the inner cylindrical body 12, molded by the primary side molding section 101, to the secondary side molding section 201.

Further, cavities 105, 205 for molding the inner cylindrical body 12 and the outer cylindrical body 13 comprise stationary side metal mold sections 102, 202; intermediate plate sections 103, 203; and movable side metal mold sections 104, 204, respectively. On the movable side metal mold sections 104, 204, penetration hole formation pins 106, 206, for molding the center hole 14 of the inner cylindrical body 12, project upwardly in such a manner that they project into the cavities 105, 205, respectively.

Moreover, at the stationary side metal mold sections 102 and 202, there are respectively disposed nozzles 107, 207, for supplying molten synthetic resin material into the cavities 105, 205. In addition, there are disposed gate sections 108, 208 positioned at the separation surfaces between the stationary side metal mold sections 102, 202 and the intermediate plate sections 103, 203, and adapted for injecting synthetic resin material delivered through the nozzles 107, 207 into the cavities 105, 205, respectively. These gate sections 108, 208 are disposed at positions corresponding to synthetic resin injection sections 21, 22 of the inner cylindrical body 12 and the outer cylindrical body 13 to be molded in the cavities 105, 205, respectively. Since the gate sections 108, 208 are provided so that they are located at separate positions between the stationary side metal mold sections 102, 202 and the intermediate plate sections 103, 203 in a manner as stated above, those gate sections 108, 208 are placed so as to face in directions perpendicular to the axial directions of the cavities 105, 205. Thus, synthetic resin material injected through the gate sections 108, 208 is injected from a direction substantially perpendicular to the axial direction of the inner cylindrical body 12 and the outer cylindrical body 13 and from the outer circumferential surfaces of the ends of the inner cylindrical body 12 and the outer circumferential side cylindrical body 13 being molded by the cavities 105, 205.

Since the gate sections 108, 208 are disposed on the sides of the stationary side metal mold sections 102, 202 in the manner stated above, the flange molding sections 105a, 205a for molding the support flange section 15 of the inner cylindrical body 12 are situated on the sides of the movable side metal mold sections 104, 204 disposed opposite to the stationary side metal mold sections 102, 202 with the intermediate plate sections 103, 203 positioned therebetween.

Figure 9:
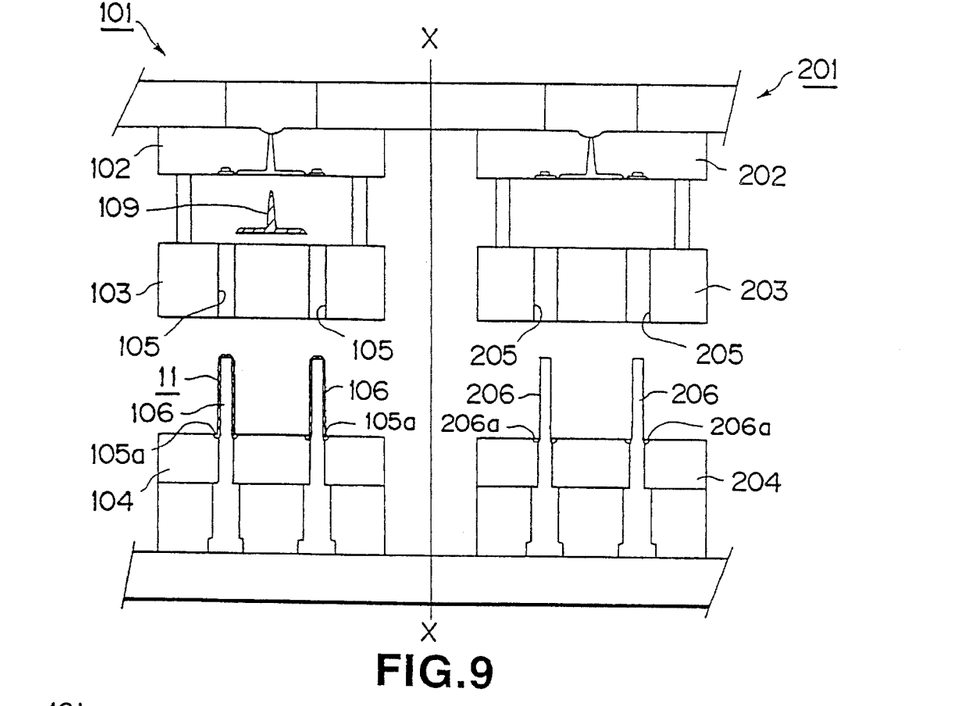
FIG. 9 is a schematic cross sectional view of a metal mold portion showing the state where an inner cylindrical body of a tape guide roller according to this invention is molded using a double molding machine.
Figure 10:
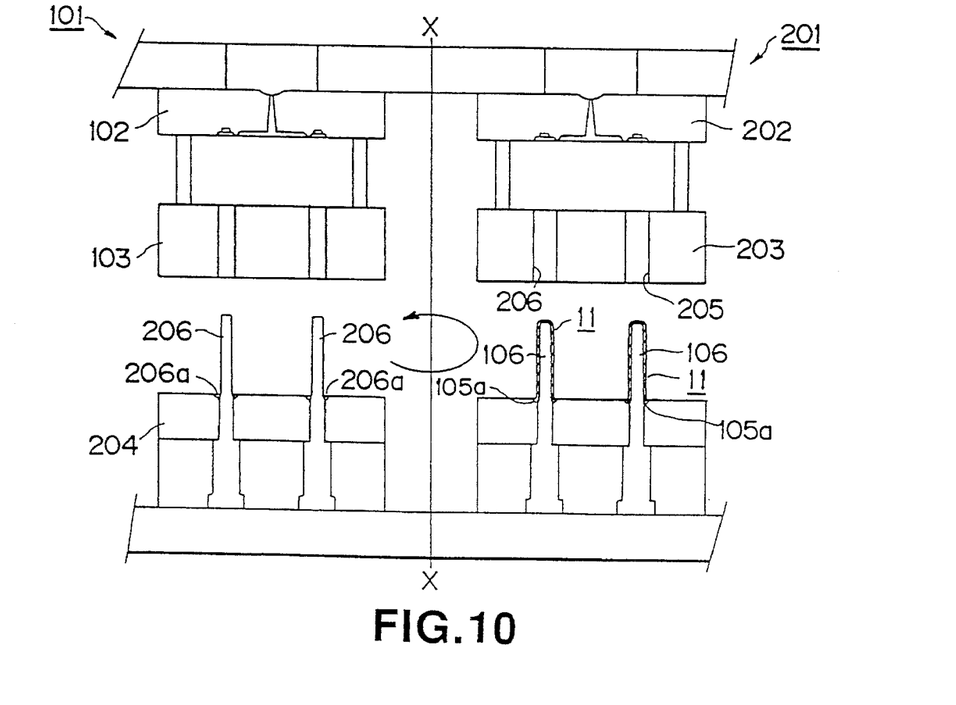
FIG. 10 is a schematic cross sectional view of the metal mold portion showing the state where a movable side metal mold portion is rotated after the inner cylindrical body is molded.
Figure 11:
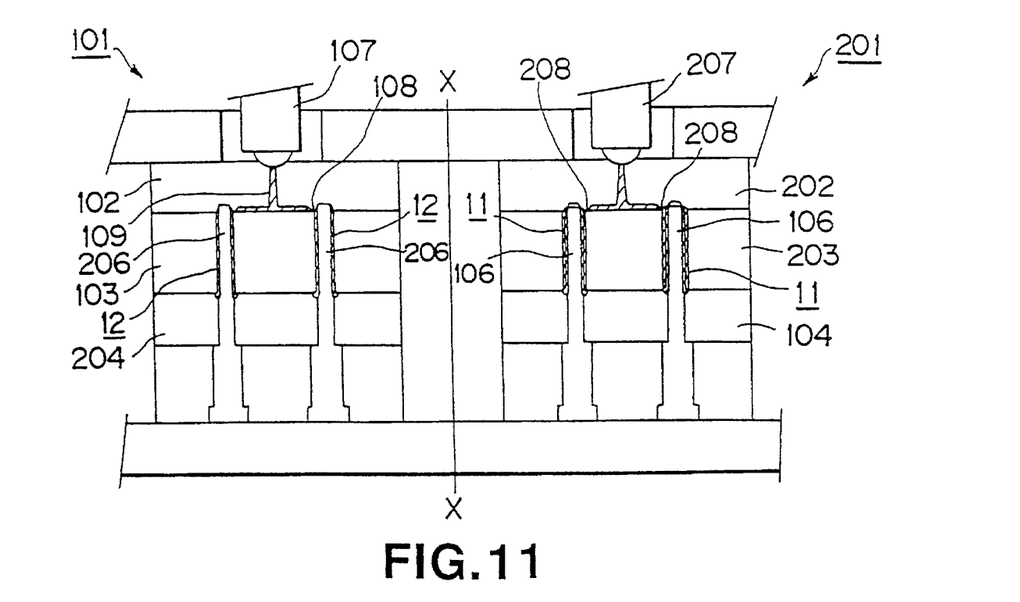
FIG. 11 is a schematic cross sectional view of the metal mold portion showing the state where an outer cylindrical body is molded on the outer circumferential side of the inner circumferential side cylindrical body by the secondary side molding portion side.

In order to form, as a molded body, the tape guide roller 11 according to this invention by using the double molding machine constituted as described above, synthetic resin material is first injected, as shown in FIG. 8, into the cavity 105 on the primary side molding section 101 to form, as a molded body, the inner cylindrical body 12. Thereafter, as shown in FIG. 9, the mold is opened to allow the intermediate plate sections 103, 203 and the movable side metal mold sections 104, 204 to be moved away from the stationary side metal mold sections 102, 202. The primary side runner section 109 is also removed. Then, as shown in FIG. 10, the movable side metal mold sections 104, 204 are rotated by an angle of 180 degrees, with the line X—X being the axis of rotation, to allow the penetration hole formation pins 106, over which the inner cylindrical body 12 is tightly fitted, to be tightly fitted into the intermediate plate section 203 of the secondary side molding section 201 as shown in FIG. 11. By injecting synthetic resin material into the cavity 205 on the secondary side molding section 201 in the state shown in FIG. 11, the outer circumferential body 13 is molded on the outer circumferential surface side of the inner cylindrical body 12 to produce a single body with the inner cylindrical body 12. At this time, synthetic resin material is also injected into the cavity 105 on the primary side molding section 101 side. Thus, molding of additional inner cylindrical bodies 12 is carried out at the same time.

Figure 12:
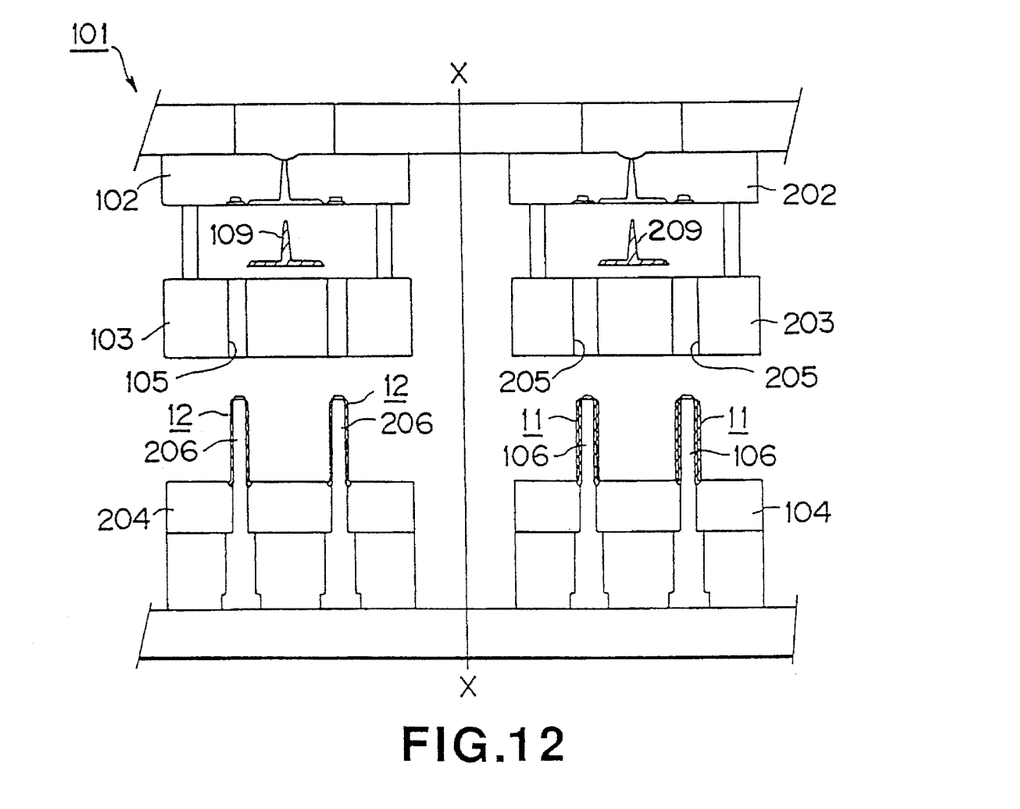
FIG. 12 is a schematic cross sectional view of the metal mold portion showing the state where the tape guide roller according to this invention is molded and is taken out by the secondary side molding portion side.

After molding the outer cylindrical body 13 by the secondary side molding section 201, the mold is opened to allow the intermediate plate sections 103, 203 and the movable side metal mold sections 104, 204 to be moved away from the stationary side metal mold sections 102, 202 for a second time as shown in FIG. 12 and to further remove the primary side runner section 109 and a secondary side runner section 209, whereby there is formed a tape guide roller 11 similar to that shown in FIG. 4 in which the outer cylindrical body 13 is integrally molded on the outer circumferential side of the inner cylindrical body 12 in the secondary side molding section 201.

By repeating the molding procedures as described above, there are formed tape guide rollers similar to that shown in FIG. 4 alternately at the primary side molding section 101 and the secondary side molding section 201.

In the case of molding tape guide rollers 11 according to this invention by the above-mentioned double molding method, the inner cylindrical body 12 is preferably made using polyacetal resin having high fluidity, and the outer cylindrical body 13 is preferably made using polyacetal resin having high fluidity in which a crystallization promoting agent is added.

By molding the outer cylindrical body 13 by using polyacetal resin in which crystallization promoting agent is added, curing (hardening) of the outer circumferential side of the outer cylindrical body 13 may be rapidly carried out. For this reason, the molding accuracy of the outer circumferential surface of the outer cylindrical body 13, which serves as a slide contact guide surface for a magnetic tape, can be maintained at an extreme high value.

In addition, also with respect to the tape guide roller 11 molded by the double molding method as described above, by implementing centerless grinding of the outer circumferential surface of the outer cylindrical body 13, similar to that previously described, a tape guide roller having circularity and straightness of a higher accuracy is provided.

Also with respect to the tape guide roller 11 molded by the double molding method, similar to the tape guide roller 11 formed by allowing the previously described independently molded inner and outer cylindrical bodies 12 and 13 to be formed into one body, the inner cylindrical body 12 may be formed as follows. Namely, synthetic resin is injected from a direction substantially perpendicular to the axial direction of the body, from the outer circumferential surface of the end portion of the body, and flange portion 15, which projects from the outer circumference of the end opposite to the end where the synthetic resin injection is carried out, is caused to be of increased thickness. For this reason, contraction after molding on the end where the flange portion 15 projects is prevented. Thus, circularity and straightness of high accuracy is guaranteed. Accordingly, circularity and straightness of the outer cylindrical body 13 molded on the outer circumferential side of the inner cylindrical body 12 can be maintained with high accuracy. Thus, circularity and straightness of the entire the tape guide roller 11 will have extremely high accuracy.

As described above, since the tape guide roller according to this invention can maintain straightness and circularity, etc. with a higher accuracy without producing a sink or withdrawal, etc. after molding of the inner cylindrical body and the outer cylindrical body which are cause to be of the double layer structure, it is possible to guide the running of a magnetic tape in a stable state without producing rotation noise when the guide is attached to the cassette and used to guide magnetic tape.

In addition, the inner cylindrical body and the outer cylindrical body are formed from two layers, thereby making it possible to use desirable materials in conformity with respective functions, respectively. Thus, improvement in the guide function of the magnetic tape can be attained, and a tape guide roller which has attained an improvement in durability can be provided.

We claim:

1. A tape guide roller for a cassette tape comprising:

an inner cylindrical body comprising a straight and circular hollow cylindrical member of essentially constant thickness and having a flange portion projecting from the outer circumference thereof at one end thereof, and a synthetic resin injection portion provided at the outer circumferential surface thereof on the opposite end thereof, said inner cylindrical body being molded by injecting synthetic resin from a direction substantially perpendicular to the axial direction thereof through said synthetic resin injection portion; and an outer cylindrical body comprising a straight and circular hollow cylindrical member of essentially constant thickness having an inside diameter sized to snugly fit over said inner cylindrical body, and two end portions, one serving as an insertion end at which said outer cylindrical body is inserted over said inner cylindrical body, the other including a synthetic resin injection portion provided at the outer circumferential surface of said outer cylindrical body, said outer cylindrical body being molded by injecting synthetic resin from a direction substantially perpendicular to its axial direction through said synthetic resin injection portion, whereby said insertion end of the outer cylindrical body seats against said flange portion of the inner cylindrical body, essentially forming an integral tape guide roller;

wherein the thickness of said outer cylindrical body, as formed, is made thicker than the thickness of said inner cylindrical body.

2. A tape guide roller for a cassette tape as set forth in claim 2, wherein the outer circumferential surface of said outer cylindrical body is formed by centerless grinding.

* * * * *

UNITED STATES PATENT AND TRADEMARK OFFICE
CERTIFICATE OF CORRECTION

PATENT NO. : 5,454,501
DATED : October 3, 1995
INVENTOR(S) : Toshikazu Konno, et al It is certified that error appears in the above-indentified patent and that said Letters Patent is hereby corrected as shown below:

Claim 2, line 2, column 10, "claim 2" should read ---claim 1---

Signed and Sealed this

Nineteenth Day of March, 1996

*Attest:*

BRUCE LEHMAN

*Attesting Officer*     *Commissioner of Patents and Trademarks*